United States Patent [19]

Regelsberger et al.

[11] Patent Number: 4,652,187
[45] Date of Patent: Mar. 24, 1987

[54] CLAMPING CHUCK FOR HOLDING DRILLING AND/OR CUTTING TOOLS

[75] Inventors: Wolfgang Regelsberger, Weissenburg; Gerhard Rumpp, Inning; Manfred Spieth, Martinsried, all of Fed. Rep. of Germany

[73] Assignee: Hilti Aktiengesellschaft, Fürstentum, Liechtenstein

[21] Appl. No.: 698,631

[22] Filed: Feb. 6, 1985

[30] Foreign Application Priority Data

Feb. 9, 1984 [DE] Fed. Rep. of Germany ....... 3404604

[51] Int. Cl.[4] ............................................. B23B 31/04
[52] U.S. Cl. ................................. 408/240; 279/1 DC; 279/64; 279/81
[58] Field of Search ........................ 279/60, 61, 62, 64, 279/65, 1 B, 1 DC, 75, 121, 81; 408/226, 239 R, 239 A, 240

[56] References Cited

U.S. PATENT DOCUMENTS

| | | | |
|---|---|---|---|
| 1,288,154 | 12/1918 | Palmgren | 279/65 |
| 1,565,227 | 12/1925 | Garrison | 279/81 |
| 2,931,660 | 4/1960 | Barwinkel | 279/65 X |
| 3,425,705 | 4/1969 | Benjamin et al. | 279/56 |
| 3,975,030 | 8/1976 | Akeel et al. | 279/121 X |
| 4,300,780 | 11/1981 | Urbanic | 279/121 X |
| 4,491,445 | 1/1985 | Hunger et al. | 279/75 X |

Primary Examiner—Z. R. Bilinsky
Attorney, Agent, or Firm—Toren, McGeady and Goldberg

[57] ABSTRACT

A clamping chuck for securing a tool in a drilling device can be used for transmitting rotary and/or percussion motion to the tool. Independently adjustable guide jaws and at least one engaging element are mounted in the chuck. The guide jaws can hold a tool shank in a frictional engagement while the engaging element can fit into a recess in the surface of the tool shank. With such separate adjustment, the guide jaws can be used alone or in combination with the engaging element for holding the tool shank.

13 Claims, 4 Drawing Figures

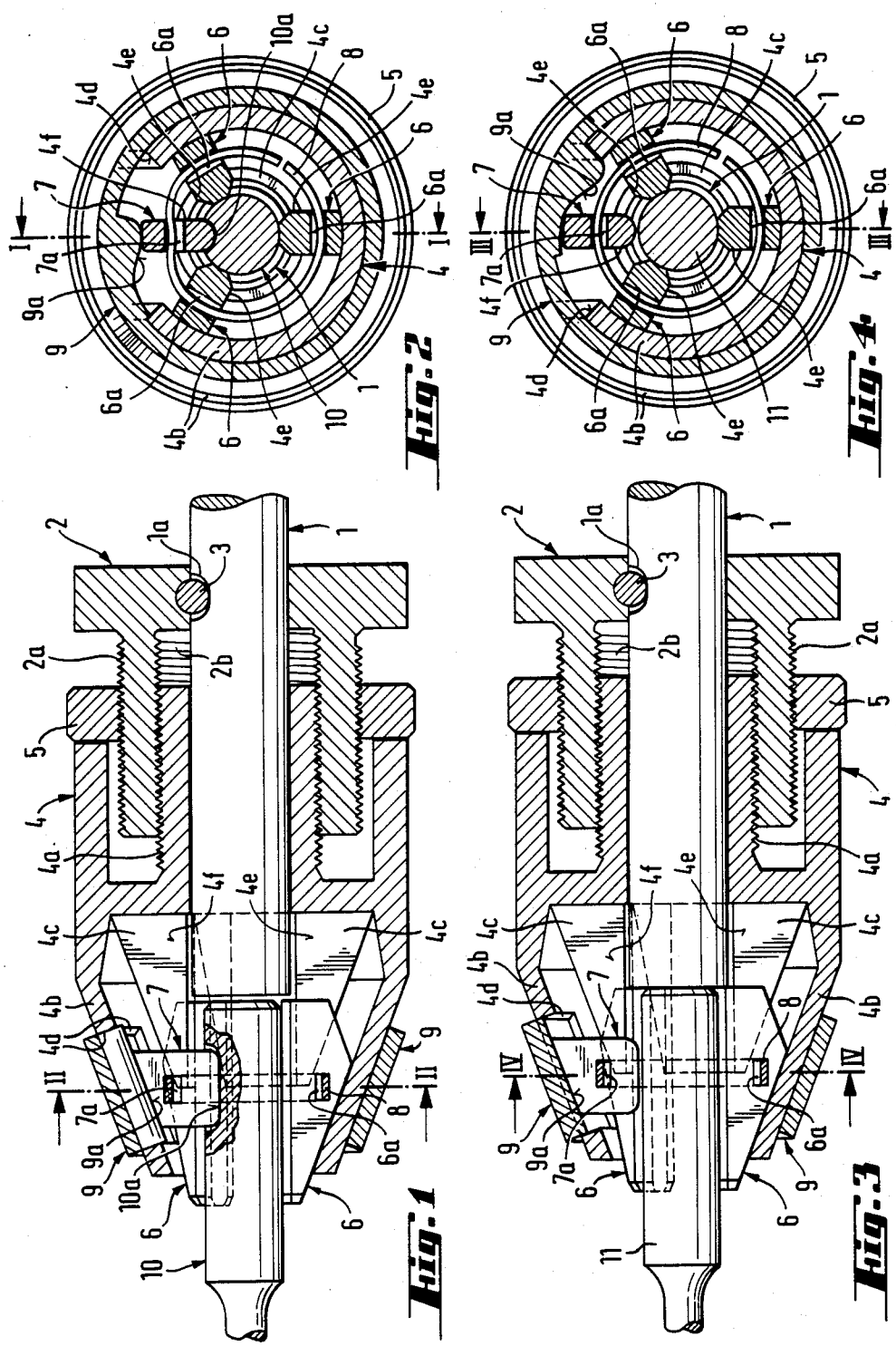

CLAMPING CHUCK FOR HOLDING DRILLING AND/OR CUTTING TOOLS

BACKGROUND OF THE INVENTION

The present invention is directed to a clamping chuck for holding drilling and/or cutting tools which have a cylindrical shank and the chuck includes at least two radially adjustable guide jaws and at least one radially adjustable engaging element which is engageable within the surface of the tool shank.

In the above type of clamping chuck it is known to transmit rotary motion to the cylindrical shank tool by friction-locking engagement of radially adjustable clamping jaws with the tool shank. The main advantage of such a chuck is that easily produced tools with smooth shank surfaces can be used. There is a substantial disadvantage, however, in that the rotary motion or torque transmitted by friction-locking engagement is limited. Chucks of this general type are usually not suited for percussion drilling, that is, for the simultaneous transmission of rotary motion and percussion motion which acts in the axial direction of the tool. Where such combined motion is to be transmitted, radially adjustable engaging elements are employed which fit into a recess in the cylindrical surface of the tool shank. This type of chuck is designed to handle only a single shank diameter and it cannot be adapted to a range of tool shank diameters.

In yet another clamping chuck three radially adjustable clamping jaws are provided as well as a radially adjustable engaging element incorporated into one of the clamping jaws. The clamping jaws are held within a conically shaped sleeve by means of a threaded ring and they can be pressed radially inwardly against the shank to be clamped. The engaging element projects radially inwardly from one of the clamping jaws and engages in a corresponding recess in the shank of the tool to be clamped. As a result, the engaging element can only be adjusted together with the clamping jaws. Therefore, only tools with a predetermined recess in the shank can be clamped in this particular chuck.

SUMMARY OF THE INVENTION

Therefore, the primary object of the present invention is to provide a clamping chuck which is adjustable and can be utilized for holding tools which have different diameter shanks. The clamping chuck can provide a friction-locking engagement with the tool to be clamped or a form-locking engagement.

In accordance with the present invention, one actuating member is provided for adjusting the guide jaws and another actuating member adjusts the one or more engaging elements.

Due to this construction of the clamping chuck it can be used for form-locking engagement of tools with different shank diameters. Further, tools with smooth cylindrical shanks, which can be simply and very economically produced, can be secured using the same clamping chuck where only friction-locking engagement is afforded. Such a clamping chuck can be used for rotary drilling alone or for the combination of rotary and percussion drilling.

The use of tools with smooth shanks for percussion drilling, where the tools are clamped in a friction type engagement, involves a loss of output. In certain applications, however, such as drilling individual holes or drilling small diameter boreholes, such a disadvantage is not significant.

Therefore, based on the present invention, the guide jaws and engaging elements can be adjusted independently of one another. Accordingly, to change a tool only the engaging elements providing form-locking engagement need to be adjusted and the guide jaws can be left at the adjusted diameter. This arrangement affords a considerable saving in time, especially when the tools are changed frequently. Moreover, any play between the guide jaws and the shank, once adjusted, can remain constant for a very long period of use.

The engaging elements are not needed for pure rotary drilling. To afford the use of the chuck for a range of shank diameters without limiting the range due to the engaging elements, it is advisable that the engaging elements can be adjusted radially outwardly to a position where they do not contact the largest diameter shank in the range to be used. The adjustment of the engaging elements is provided by a corresponding actuating member with the engaging elements or the actuating member being locked in the disengaged position, for instance, by a locking member. When the diameter of the tool shank changes, the guide jaws must be adjusted radially and adapted to the shank. In such a situation, however, the engaging elements must also be adjusted. To simplify such adjustment the actuating members for the guide jaws and the engaging elements can be advantageously coupled together. As a result, an adjustment of the guide jaws can result simultaneously in an adjustment of the engaging elements. The converse is true for the guide jaws when the engaging elements are adjusted.

For a compact construction of the clamping chuck, it is advisable to form the actuating member for the guide jaws as an axially adjustable conically shaped sleeve. The guide jaws are supported on the inside of the conical portion of the sleeve. When the sleeve is adjusted a relative movement occurs between the guide jaws and the inside surface of the conical portion of the sleeve causing movement in the axial direction with a corresponding movement in the radial direction because of the conical surface.

In contrast to the guide jaws, the engagement elements usually do not need to be finely adjusted, they need only to be moved into an engaged or disengaged position. For adjusting the engaging elements, the corresponding actuating member can be an actuating ring with a radially inwardly directed cam. Such a cam can extend in the circumferential direction as well as in the axial direction of the ring. To engage and disengage the engaging elements, the actuating member for the guide jaws, as well as for the engaging elements, must be adjusted relative to one another. To facilitate such adjustment it is advisable to accommodate the actuating ring for the engaging element on the conically shaped sleeve. The combination of the actuating ring on the actuating member for the guide jaws provides a very compact construction of the clamping chuck.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an axially extending sectional view of a clamping chuck embodying the present invention with a tool held in a form-locking manner within the chuck;

FIG. 2 is a transverse cross-sectional view of the clamping chuck shown in FIG. 1 taken along the line II—II;

FIG. 3 a sectional view, similar to FIG. 1, however, with the clamping chuck providing friction-locking engagement with the tool; and FIG. 4 is a transverse cross-sectional view of the clamping chuck shown in FIG. 3 taken along the line IV—IV.

DETAILED DESCRIPTION OF THE INVENTION

As shown in FIGS. 1 to 4 an axially extending anvil 1 mounts a clamping chuck. Though not shown, the anvil extends into the chuck from a drilling device or the like. The anvil 1 can transmit rotary and/or percussive motion from the drilling device to a tool. The clamping chuck is secured to the anvil by means of an axially extending threaded ring 2 laterally enclosing an axially extending part of the anvil 1. The connection between the anvil 1 and the ring 2 is afforded by a pin 3 extending tangentially relative to the base of a recess 1a formed in the anvil. As can be seen in FIGS. 1 and 3, the axial extent of the recess 1a is greater than the diameter of the pin 3 so that a slight axial displacement is possible for the threaded ring 2 relative to the anvil 1. In addition to the rear end part of the ring 2 which closely encircles the anvil 1, the ring has an axially extending sleeve-like part spaced radially outwardly from the anvil and having a male thread 2a on its radially outer surface and a female thread 2b on its radially inner surface. The threaded ring 2 is connected by the female thread 2b with an axially extending portion of a sleeve 4. At its front end the sleeve 4 has an axially extending conically shaped part 4b converging inwardly toward the axis of the anvil 1. The sleeve 4 is rotatably supported on the anvil 1. The sleeve 4 has a male thread 4a at its rearward end which is in threaded engagement with the female thread 2b on the threaded ring 2. By turning or rotating the sleeve 4 relative to the threaded ring 2, the sleeve can be displaced in the axial direction on the anvil 1. To fix the sleeve 4 in a determined position, a counter nut 5 is provided in threaded engagement with the male thread 2a on the threaded ring 2. While the rear portion of the sleeve 4 is cylindrically shaped the front portion is the conically shaped part 4b which has a conical inner and outer surface. Within the conically shaped part 4b, a guide attachment 4c is provided in the sleeve 4. The axially extending guide attachment 4c has radially and axially extending slots 4e and 4f. Three guide jaws 6 spaced angularly apart around the interior of the conically shaped part 4b are located in the slots 4e, and an engaging element 7 is located in the slot 4f. As a result, the guide jaws 6 and the engaging element 7 can be axially and radially displaced within the slots 4e, 4f. The radially outer ends of the guide jaws 6 are supported on the inside conical surface of the conically shaped part 4b. Each of the guide jaws 6 has a circumferentially extending slot 6a and the engaging element 7 has a similar circumferentially extending slot 7a through which an annular spring 8 extends for biasing the guide jaws 6 and the engaging element 7 radially outwardly. An actuating ring 9 encircles the outside surface of the conically shaped part 4b and provides adjustment for the engaging element 7. As can be seen in FIG. 2, the actuating ring 9 has a radially inwardly extending cam 9a extending through an opening 4d in the conically shaped part and extending into the interior of such part. The actuating ring can be rotated in the circumferential direction relative to the conically shaped part 4b for a limited extent. By rotating the actuating ring 9, its cam 9a moves in the circumferential direction relative to the engaging element 7 so that the engaging element is pressed radially inwardly or moves radially outwardly due to the biasing action of the spring 8.

In FIGS. 1 and 2 a shank 10 of a tool is secured within the clamping chuck. Shank 10 extends axially outwardly from the front end of the anvil 1. The shank is cylindrically shaped and has an axially extending groove 10a formed in its surface into which the engaging element is fitted. The shank 10 is engaged for rotation by the form-locking engagement of the engagement element 7 within the axially extending groove 10a in the surface of the shank. The guide jaws 6 serve to guide the shank 10 and can be adjusted relative to the cylindrical surface of the shank so that a slight radial play is provided which permits a limited axial movement of the shank 10 relative to the clamping chuck. Such axial movement of the shank is desirable for percussion drilling. By means of the counter nut 5, the sleeve 4 can be prevented from rotating relative to the threaded ring 2 during operation and the adjusted play can be kept from changing. To change tools with the same outside diameter of the shank 10, it is necessary only to turn the actuating ring 9 relative to the conically shaped part 4b of the sleeve 4 into the position as shown in FIG. 4 so that the engaging element 7 is displaced out of engagement with the shank 10. After a new tool is inserted into the chuck, the actuating ring is turned back into the position shown in FIG. 2 with the engaging element 7 fitted into form-locking engagement with the groove or recess 10a in the shank.

In practice, tools with cylindrical shanks 11 but without longitudinal grooves as shown in FIG. 1 must occasionally be clamped in the chuck. Such a shank 11 is shown in FIGS. 3 and 4. In the arrangement shown in FIGS. 3 and 4, the actuating ring 9 is turned into the position as illustrated in FIG. 4 and the spring 8 moves the engaging element 7 radially outwardly beyond the circumferential surface of the shank, that is, the radially inner end of the engaging element 7a is displaced outwardly from the radially inner ends of the guide jaws 6. As can be seen in FIG. 4 the shank 11 is held by the angularly spaced guide jaws 6. As a result, rotary motion is transmitted to the shank 11 by the friction-locking contact of the guide jaws 6 with the shank. In this arrangement, the clamping chuck is clamped so that no play occurs between the shank 11 and the guide jaws 6.

Due to the arrangement of the actuating ring 9 on the conically shaped part 4b of the sleeve 4, the actuating member for the guide jaws 6 along with the actuating member for the engaging element 7 are coupled to one another so that when the guide jaws are adjusted, the engaging element 7 is located outside the diameter range formed by the guide jaws. To prevent any displacement of the sleeve 4 and its conically shaped part 4b, and accordingly, any movement of the guide jaws 6 during operation, the sleeve 4 can be secured relative to the threaded ring 2 by means of the counter nut 5.

While specific embodiments of the invention have been shown and described in detail to illustrate the application of the inventive principles, it will be understood that the invention may be embodied otherwise without departing from such principles.

We claim:

1. Clamping chuck for use in securing in a drilling device or the like a drilling and/or cutting tool having a shank with a cylindrical surface, comprising at least two guide jaws for engagement with the cylindrical surface of the shank and said guide jaws being radially adjustable relative to the cylindrical surface of the shank, at least one engaging element arranged to engage within and radially inwardly of the cylindrical surface of the shank, wherein the improvement comprises means for laterally enclosing said guide jaws and said engaging element, said means having an outside surface accessible for operating said clamping chuck, said means including a first actuating member accessible at the outside surface for radially adjusting the position of said guide jaws, and a second actuating member accessible at the outside surface for separately adjusting said at least one engaging element whereby the adjustment of said at least one engaging element can be effected without adjusting said guide jaws, and said first actuating member comprises an axially extending conically shaped part having a conically shaped inner surface in engagement with said guide jaws so that axial movement of said conically shaped part effects axial and radial movement of said guide jaws.

2. Clamping chuck, as set forth in claim 1, wherein said at least one engaging element can be adjusted between a radially outer position and a radially inner position with the radially outer position being spaced radially outwardly from the largest shank diameter to be received in said chuck.

3. Clamping chuck, as set forth in claim 1 or 2, wherein said first and second actuating members can be coupled with one another.

4. Clamping chuck, as set forth in claim 1, wherein said second actuating member is formed as an actuating ring having a radially inwardly extending cam engageable with said at least one engaging element for displacing said at least one engaging element radially inwardly and outwardly.

5. Clamping chuck, as set forth in claim 4, wherein said actuating ring is supported on and encircles said conically shaped part and is rotatable relative to said conically shaped part with said cam projecting radially inwardly and extending through said conically shaped part into engagement with said at least one engaging element.

6. Clamping chuck for use in securing in a drilling device or the like a drilling and/or cutting tool with an axially extending shank having an axially extending cylindrical surface, comprising an axially extending anvil for transmitting at least one of rotary and percussion motion, chuck means mounted on said anvil for securing the tool relative to said anvil so that the at least one of rotary and percussion motion can be transmitted to the tool, said chuck means comprising at least two guide jaws spaced angularly apart for engagement with the cylindrical surface of the shank and said guide jaws being radially adjustable relative to the cylindrical surface of the shank, at least one engaging element arranged to engage within and radially inwardly of the cylindrical surface of the shank, wherein the improvement comprises means for laterally enclosing said guide jaws and said engaging element, said means having an outside surface accessible for operating said clamping chuck, said means including a first actuating member accessible at the outisde surface for radially adjusting the position of said guide jaws, and a second actuating member for separately adjusting said at least one engaging element whereby the adjustment of said at least one engaging element can be effected without adjusting said guide jaws.

7. Clamping chuck, as set forth in claim 6, wherein said second actuating member is arranged to radially adjust said at least one engaging element between a radially inner position and a radially outer position, said chuck being arranged to receive a range of shank diameters, and the radially outer position of said engaging element being such that it is located radially outwardly from the largest shank to be received in said chuck.

8. Clamping chuck, as set forth in claim 6, wherein said first actuating member comprises an axially extending sleeve encircling said anvil with said sleeve having a radially inner surface in rotatable contact with the surface of said anvil, said sleeve having a conically shaped part extending axially from said part in rotatable contact with said anvil, said guide jaws being mounted in said conically shaped part, a threaded ring laterally enclosing said anvil and disposed in threaded engagement with an axially extending surface on said sleeve spaced radially outwardly from the surface in rotatable contact with said anvil, means for securing said ring to said anvil, said sleeve being axially displaceable relative to said ring so that said conically shaped part radially adjusts said guide jaws.

9. Clamping chuck, as set forth in claim 8, wherein said second actuating member comprises an actuating ring mounted on the radial outer surface of said conically shaped part and being rotatable for a limited amount about said conically shaped part, a radially inwardly directed cam formed on the inside surface of said ring and extending through said conically shaped part into contact with said at least one engaging element for radially adjusting the position of said at least one engaging element.

10. Clamping chuck, as set forth in claim 9, wherein said sleeve has an axially extending attachment formed within and located radially inwardly from said conically shaped part, said attachment forming axially and radially extending slots within said conically shaped part with one said slot for each of said guide jaws and said at least one engaging element.

11. Clamping chuck, as set forth in claim 10, including an annular spring extending through each of said guide jaws and said at least one engaging element and biasing said guide jaws and said at least one engaging element radially outwardly.

12. Clamping chuck, as set forth in claim 11, including a counter nut in threaded engagement with said ring and movable into contact with said sleeve for securing said sleeve in position relative to said ring.

13. Clamping chuck, as set forth in claim 1 or 6, wherein said chuck has an axis of rotation, said guide jaws extend in the direction of said axis of rotation, said at least one engaging element is located in the region where said guide jaws extend in the direction of said axis of rotation, and said at least one engaging element being spaced angularly around said axis of rotation from said guide jaws.

* * * * *